(12) United States Patent
Williams

(10) Patent No.: US 6,644,133 B2
(45) Date of Patent: Nov. 11, 2003

(54) FLOW METER MODULE FOR A CONTROLLER

(75) Inventor: Michael B. Williams, Rowley, MA (US)

(73) Assignee: Schneider Automation, Inc., North Andover, MA (US)

( * ) Notice: Subject to any disclaimer, the term of this patent is extended or adjusted under 35 U.S.C. 154(b) by 0 days.

(21) Appl. No.: 09/784,375

(22) Filed: Feb. 15, 2001

(65) Prior Publication Data

US 2002/0108452 A1 Aug. 15, 2002

(51) Int. Cl.[7] .............................................. G01F 15/00
(52) U.S. Cl. ................................................... 73/861.77
(58) Field of Search ......................... 73/861.77, 861.78, 73/861.79, 861.74, 861.75, 861.01

(56) References Cited

U.S. PATENT DOCUMENTS 4,581,946 A * 4/1986 Kanayama .................. 702/100
RE33,649 E * 7/1991 Kawai ........................ 137/554
5,072,416 A * 12/1991 Francisco et al. ........... 702/100
6,104,875 A 8/2000 Gallagher et al.

OTHER PUBLICATIONS

"WSTAR™ 2000 Data Sheet", Flow Computers by Hoffer, The Turbine Flowmeter Company.

* cited by examiner

Primary Examiner—Hezron Williams
Assistant Examiner—Corey D. Mack
(74) Attorney, Agent, or Firm—Michael J. Femal; Larry I. Golden

(57) ABSTRACT

A method and apparatus for utilizing a controller to monitor a flow volume in a fluid transportation system. The controller being operably connected to a module. The module being operably connected to a flow meter. The module senses a series of pulses that represent a known fluid volume in a proving loop. The module also measures the fluid density of the fluid in the proving loop. The controller utilizes a dynamic density of the fluid and the sensed pulses to determine a correction factor to more accurately calculate the flow volume through the measuring flow meter. The controller ensures the accuracy of the flow meter by utilizing the partial pulses sensed during a meter-proving period by using an interpolation method.

18 Claims, 5 Drawing Sheets

FLOW METER MODULE FOR A CONTROLLER

The present invention is generally related to monitoring and controlling a fluid transportation system. More specifically, the present invention is directed to a controller having a flow meter module for monitoring and controlling a fluid flow volume in a fluid transportation system.

BACKGROUND OF THE INVENTION

The production, transportation and sale of energy products has always required some form of measurement to determine the quantity produced, bought or sold. The accuracy and reliability of a system that measures an energy product, i.e., gas and liquid, is extremely important to the buyers and sellers involved. A seemingly insignificant error within the measuring system can result in extensive monetary losses.

Technological advances in the areas of fluid flow metering and computation has led to improved accuracy and reliability. Some of these advances have been made in the area of metering, or measuring, transported energy products. These advances have also focused on factors such as safety, reliability and standardization.

Today's metering and transfer system involves more than simply measuring fluid flow; it can also involve extensive electronics, software, communications interfaces, analysis and control. Measuring fluid flow includes multiple turbine meters with energy flow computers, densitometers, gas chromatography, meter-proving systems and RTU or SCADA interfaces. Measurement and control of energy sources is a valuable process for companies producing and transporting energy sources. Many governments, organizations and industries have enacted standards and regulations related to the recovering, refining, distributing and selling of oil and oil by-products, i.e., gasoline, kerosene, butane, ethanol, etc. The energy resource industry has various standards and regulations to ensure the accuracy and safety of transporting and metering these energy sources.

The process of transporting fluid, typically oil, through a pipeline is monitored and controlled with the assistance of a combination of sensors and process computers. Generally, a computer processor monitors the several aspects of the oil transportation, such as fluid flow volume. The control of the equipment facilitating the transportation of oil is generally performed by environmentally robust devices such as a controller. The controller regulates valves, tanks and scales without requiring an individual to constantly interact with the system.

A very important aspect of a fluid transportation system involves the fluid flow meters utilized to monitor the amount of oil delivered to a customer. Because of the vast amounts of fluid delivered, the accuracy of the fluid flow meter must be ensured at regular intervals. An inaccurate fluid flow meter can result in overcharging or undercharging a customer for the delivered product.

A turbine flow meter is an accurate and reliable flow meter for both liquids and gas volumetric flow. Some applications utilizing a turbine flow meter involve water, natural gas, oil, petrochemical, beverage, aerospace, and medical. The turbine comprises a rotor having a plurality of blades mounted across the flow direction of the fluid. The diameter of the rotor is slightly less than the inner diameter of the conduit, and its speed of rotation is proportional to the volumetric flow volume. Turbine rotation can be detected by solid-state devices or mechanical sensors.

In one application incorporating a variable reluctance coil pick-up, a coil is a permanent magnet and the turbine blades are made of a material attracted to a magnet. As each blade passes the coil, a voltage pulse is generated in the coil. Each pulse represents a discrete volume of liquid. The number of pulses per unit volume is called the meter's K-factor.

In another application utilizing inductance pick-up, a permanent magnet is embedded in the rotor. As each blade passes the coil, a voltage pulse is generated. Alternatively, only one blade is magnetic and the pulse represents a complete revolution of the rotor. Depending upon the design, it may be preferable to amplify the output signal prior to its transmission.

Proving the fluid flow meter is a process for ensuring the accuracy of the flow meter. Typically, a section of the fluid system called a proving loop is utilized during the meter proving. The dimensions of the proving loop are known and the flow of fluid within the loop can be monitored by sensors wherein a variety of fluid characteristics can be sensed. The meter-proving process simultaneously monitors a pulse signal generated by a turbine operably connected within the fluid system. The flow volume of the fluid is determined by utilizing the sensed values with industrial standard flow volume equations, e.g., American Gas Association and American Petroleum Institute standard equations. The calculated flow volume is then compared to the known flow volume of the proving loop. By comparing the calculated fluid flow volume to the known fluid flow volume of the proving loop, the accuracy of the flow meter can be determined.

The duration of a meter-proving process is generally one-hundred-thousand turbine pulses. This amount of time is believed to be adequate to accurately determine the fluid flow volume. Generally, the turbine pulse signal is not in synch with the flow meter proving process, i.e., the meter proving process will generally not start at the beginning of the turbine pulse signal. When the pulses are counted at the end of the proving period, the partial pulses occurring at the beginning and end of the proving period are omitted. Because of the duration of the proving period, it is generally believed that these partial pulses are negligible. However, utilizing the partial pulses and other characteristics of the monitored fluid can reduce the time required for the meter proving process, thus reducing the length of the proving loop.

This invention is directed to solving these and other problems.

SUMMARY OF THE INVENTION

The present invention is directed to utilizing a controller to monitor a flow volume in a fluid transportation system. The controller, preferably a programmable logic controller, cooperates with a flow meter to sense a fluid and determine a flow volume. The controller also ensures the accuracy of the flow meter using an interpolation method. As a result, a less expensive implementation of monitoring a fluid transportation system with a controller can be realized.

An embodiment of the present invention is directed to a method of proving a flow meter. The flow meter is connected to a controller and a proving loop within a fluid transportation system. The proving loop has a known flow volume. The controller monitors a fluid flow within the proving loop. The method comprises the steps of starting a meter-proving period and sensing a pulse signal responsive to a flow meter. The flow meter generates a fluid flow through the fluid transportation system. The meter-proving process is terminated and the amount of sensed pulse signals occurring during the meter-proving period is calculated. The fluid flow volume of the proving loop is determined in response to the pulse signals occurring during the meter-proving process and other sensed characteristics, preferably density, of the fluid. The calculated flow volume of the proving loop is compared against the known volume of the proving loop. The meter-proving process is executed within the controller.

The calculation of the sensed pulse signals is the sum of the full pulse signals and the partial pulse signals occurring during the meter-proving process. The partial pulse signals are interpolated to provide an accurate pulse signal measurement.

A further aspect of the above embodiment of the present invention is directed to adjusting the flow meter and/or controller in response to the comparison of the calculated flow volume of the proving loop and its known flow volume, wherein the fluid flow meter and/or controller more accurately calculate the flow volume.

A further embodiment of the present invention is directed to method of measuring a flow volume of a fluid within a conduit. A controller is connected to a flow meter and the conduit. The controller monitors the fluid flow volume through a plurality of input channels operably connected to the flow meter of a fluid transportation system. The controller senses a pulse signal generated by the flow meter over a period of time determined by the size of the meter-proving loop. A densitometer being operably connected to the controller senses the real time density of the fluid. The density of the fluid is sensed and stored by the controller as a dynamic variable to be utilized in the determination of the flow volume. The controller utilizes the sensed dynamic density in cooperation with an industrial standard, API 2540, which yields a correction factor, M, to be used by another standard industrial equation, AGA-7, for calculating a flow volume through the measuring flow meter.

Significant cost savings can be attained by implementing a less expensive controller capable of performing the monitoring and control functionality required for determining a flow volume. In addition, more accurate flow volume calculations can be obtained by utilizing additional characteristics, i.e., real time density values, in cooperation with the industrial standard equations.

Other advantages and aspects of the present invention will become apparent upon reading the following description of the drawings and detailed description of the invention.

DETAILED DESCRIPTION OF PREFERRED EMBODIMENT

Figure 1:
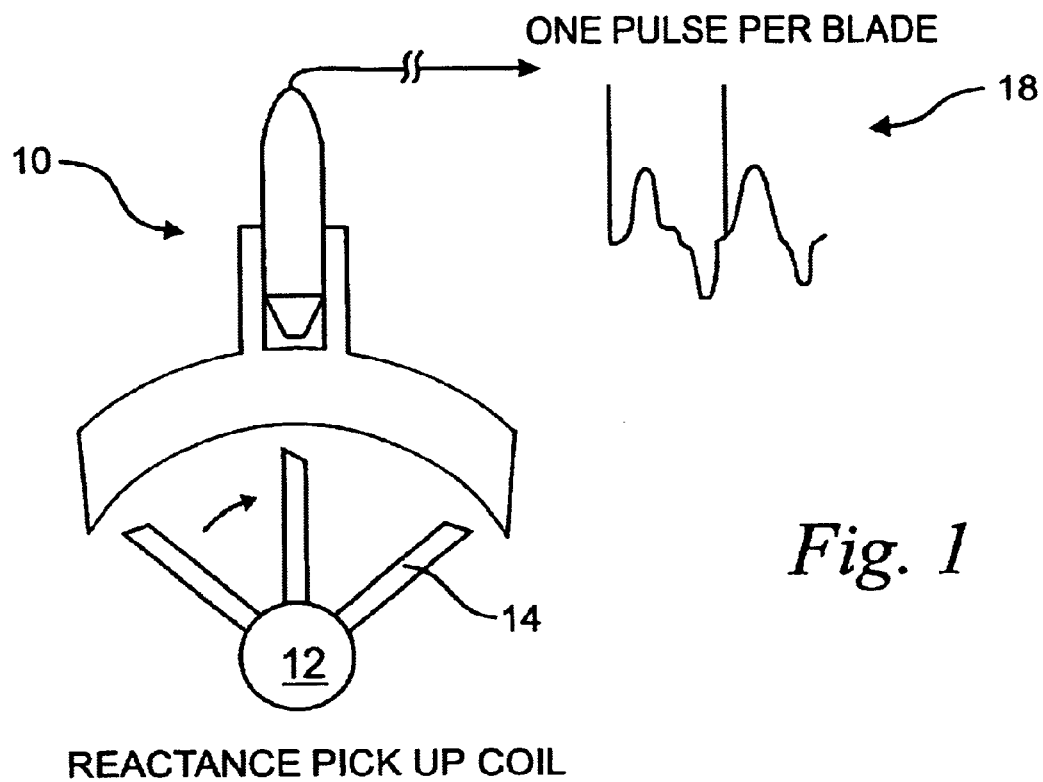
FIG. 1 is diagram depicting one embodiment of a turbine flow meter.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Figure 2:
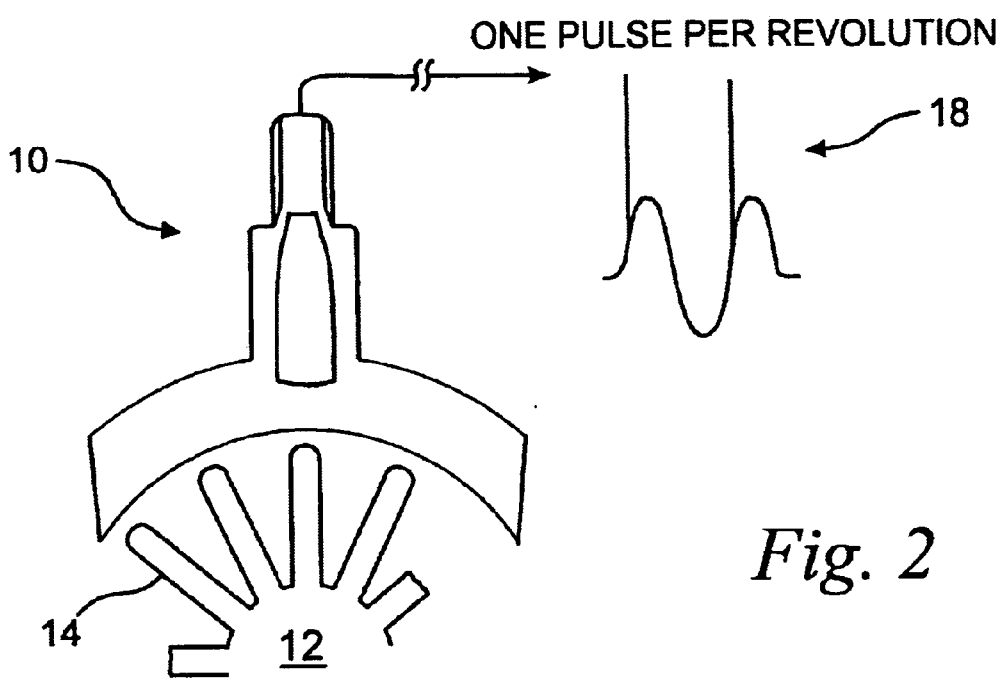
FIG. 2 is a diagram depicting another embodiment of a turbine flow meter.

A flow meter 10, preferably a turbine, comprises a rotor 12 having a plurality of blades 14 mounted across the flow direction of the fluid within a conduit 16. See FIGS. 1 and 2. The diameter of the rotor 12 is slightly less than the inner diameter of the conduit 16, or pipe, and its speed of rotation is proportional to the volumetric flow volume. Turbine rotation can be detected by solid-state devices or mechanical sensors. As each blade 14 revolves, a voltage pulse is generated. Each pulse represents a discrete volume of liquid. Alternatively, only one blade 14 can generate a pulse, thus, each pulse represents one complete revolution of the rotor 12. The number of pulses per unit volume is called the meter's K-factor.

The volume of rotation and registration of each rotor blade 14 implies the passage of a fixed volume of fluid. Fluid flow in a pipeline is the actual volume of fluid that passes a given point during a specified time. Volumetric flow can be calculated by monitoring various characteristics of the fluid, such as velocity, density, temperature and pressure. These characteristics are monitored by a controller 20 for use with industrial standard equations for fluid flow calculation, preferably in accordance with AGA and API standards.

Figure 3:
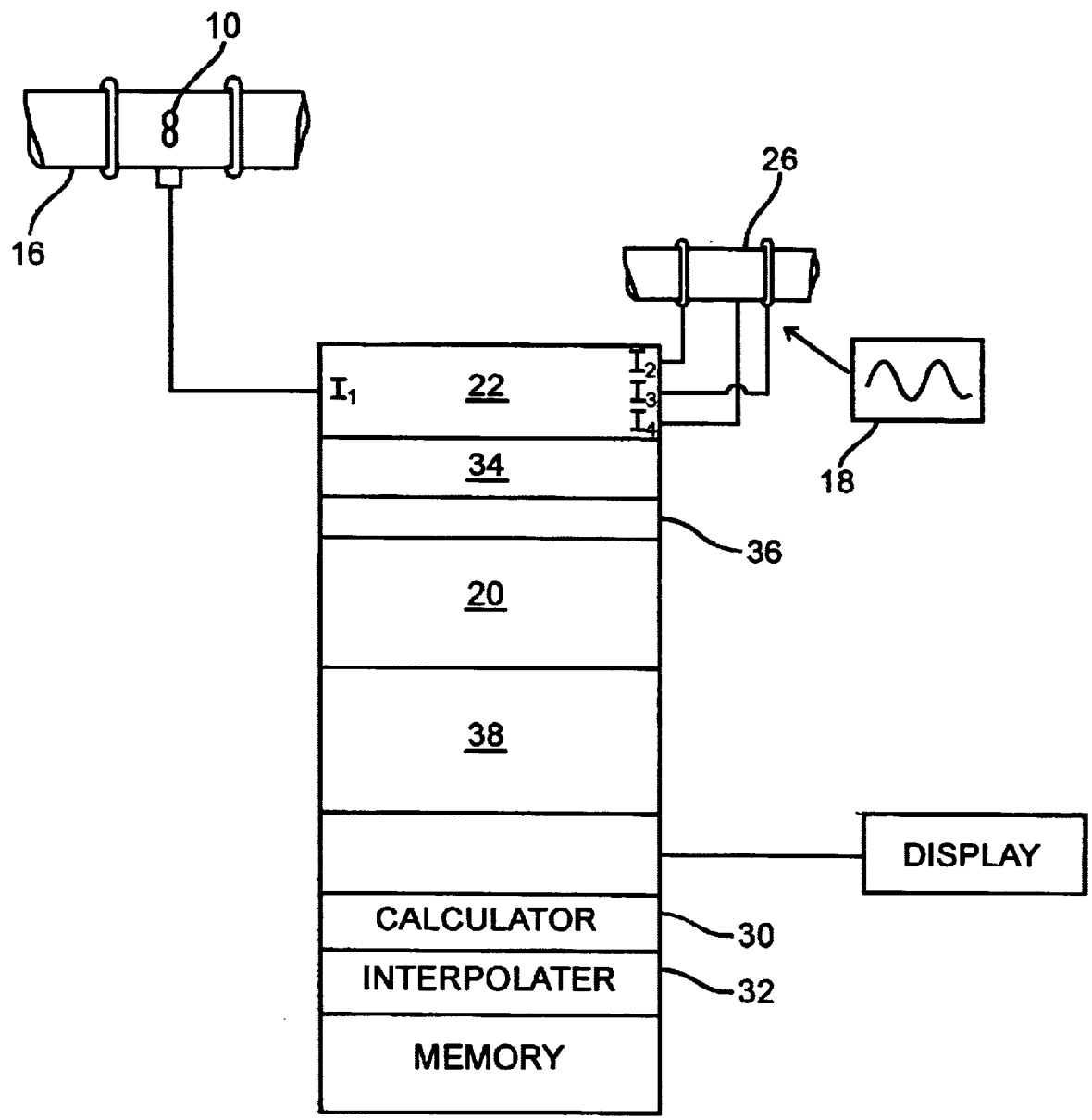
FIG. 3 is a block diagram of one embodiment of the present invention.

A controller 20 having a module 22 operably attached to the backplate of the controller, is operably connected to the flow meter 10 via a plurality of input channels. See FIG. 3. The pulse signal generated by the turbine 10 is received by the module 22. The input channels of the module 22 are adapted to receive input signals in the range of 25 mV–30V DC. Thus, the module 22 can be directly connected to the flow meter 10. The module 22 receives the flow meter frequency signal and can be programmed with K and M factors for converting the frequency input to a specified volumetric flow volume measurement unit. Typical units of volumetric flow include gallons (or liters) per minute and cubic feet (or meters) per minute.

Figure 4:
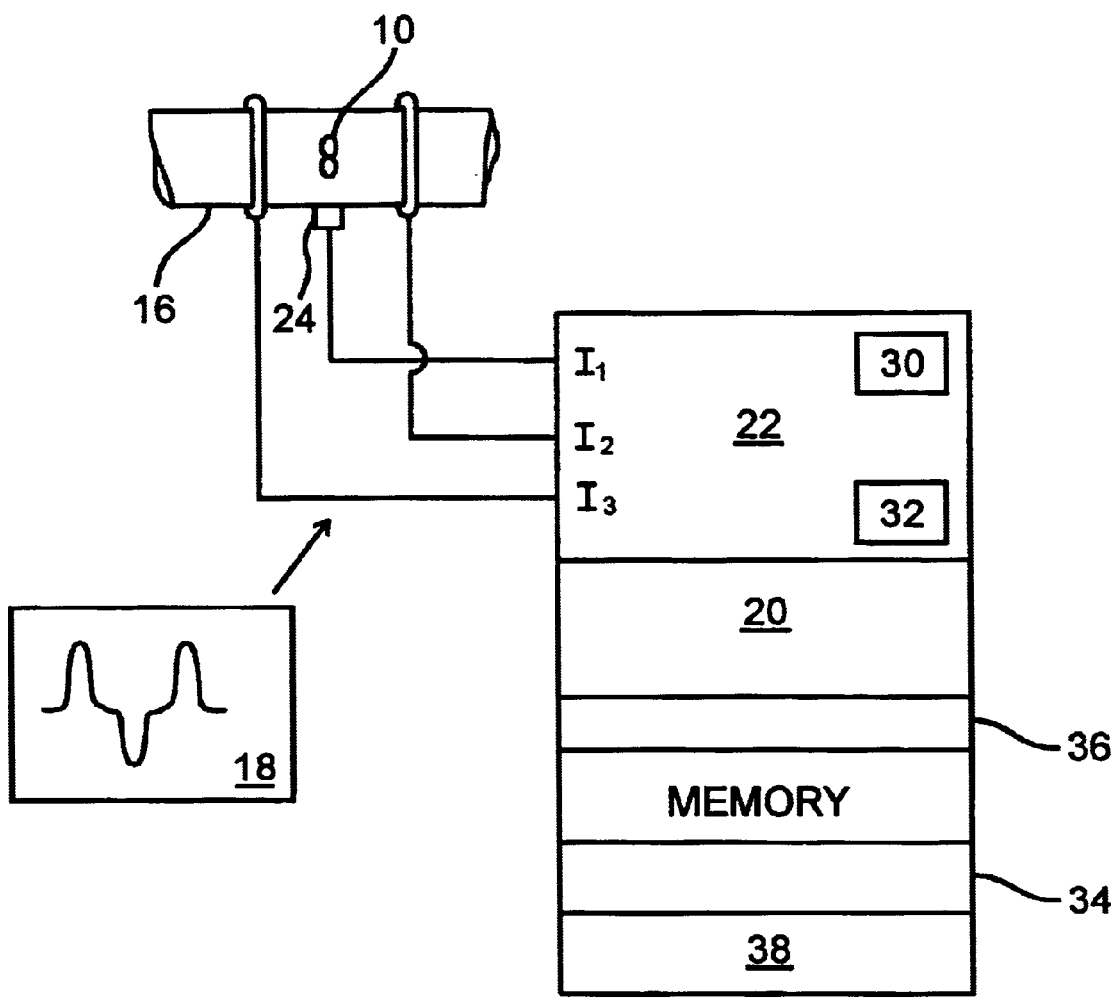
FIG. 4 is a block diagram of another embodiment of the present invention.

A more accurate flow volume can be obtained by utilizing an additional characteristic, i.e., real time fluid density, of the monitored fluid in cooperation with the industrial standard equations. See FIG. 4. A densitometer 24 is operably connected to an input channel of the controller 20. The densitometer 24 senses the density of the fluid within the pipeline. The real-time sensed density value is utilized with the API 2540 standard to calculate a correction factor, M, for the AGA-7 flow equation that measures the fluid flow through a flow meter. Preferably, the real-time sensed density values are stored as a dynamic variable within the module 22. Utilizing dynamic density values with an API 2540 dual chronometry pulse interpolation standard equation takes into account the effects that changing pressure and temperature of the fluid (and the material of the conduit 16 itself) will have on the calculated flow volume. The use of the dynamic density values provides for a more accurate flow volume than a flow volume calculated with a static density variable for the fluid having an assumed temperature and pressure value.

Figure 3A:
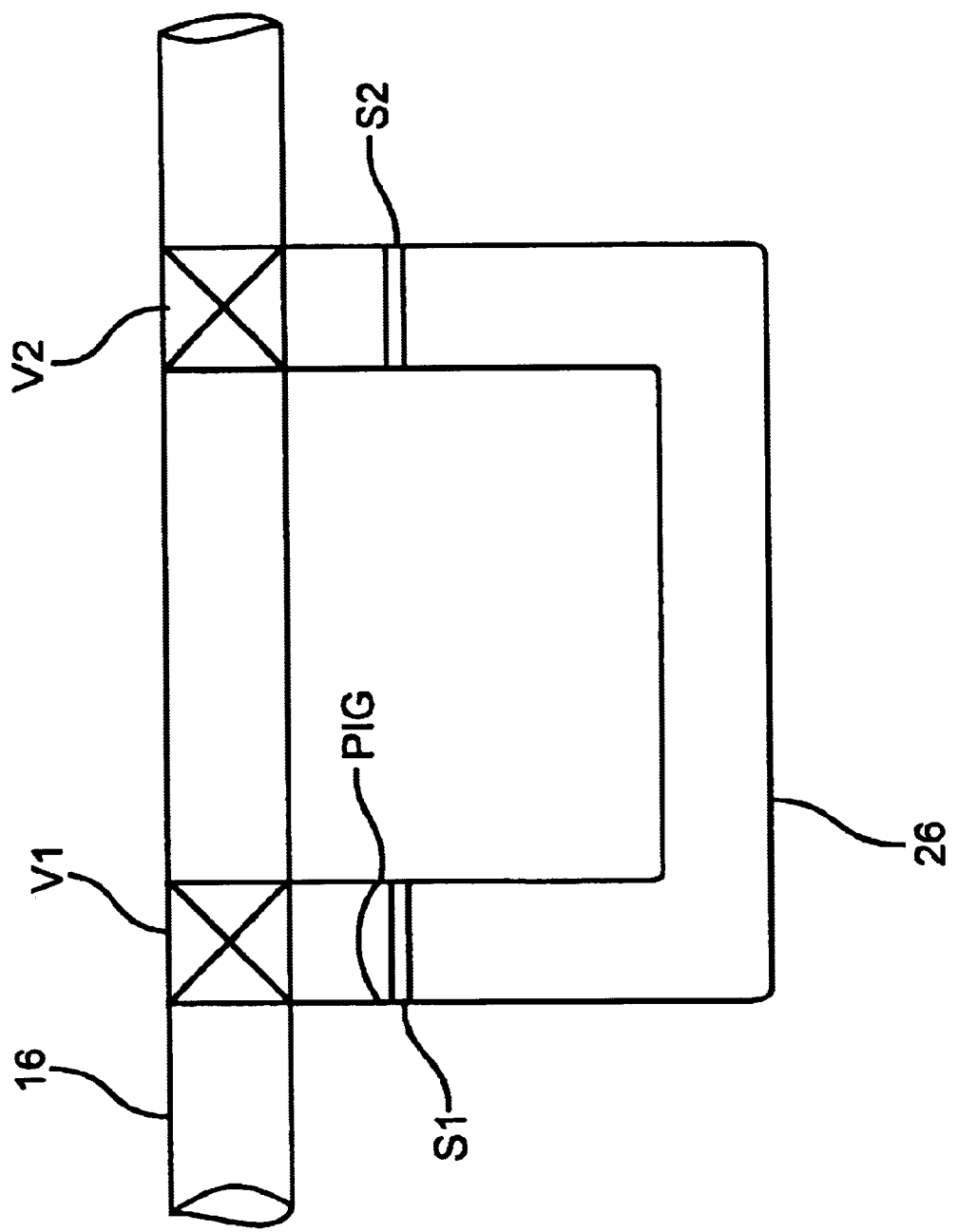
FIG. 3A is a block diagram of an embodiment of a proving loop used with the present invention.

Proving the fluid flow meter 10 is a process for ensuring the accuracy of the flow meter. See FIGS. 3 and 3A. Typically, a section of the pipeline 16 called a proving loop 26 is utilized during the meter proving. The dimensions of the proving loop 26 are known and the flow of fluid through the loop can be monitored by sensors wherein a variety of fluid characteristics can be sensed. The flow volume of the fluid is determined by utilizing the sensed characteristics with industrial standard flow volume equations, e.g., AGA-7. A comparator 38 compares the calculated flow quantity to the known flow volume of the proving loop 26.

During the meter-proving process, the controller 20 senses the amount of pulse signals generated by a turbine 10 that occur. The controller utilizes a calculator 30 to calculate the fluid volume for the proving loop 26 in response to the sensed pulse signals that occurred during the meter-proving process. By comparing the calculated fluid flow volume to the known fluid flow volume of the proving loop 26, one can determine the accuracy of the flow meter 10.

The proving loop 26 is a U-shaped conduit having a known fluid volume. The proving loop 26 is operably attached to the fluid transportation system. A pair of valves V1, V2 connect the ends of the proving loop 26 to the system. At the start of the meter-proving process, the valves are switched to allow fluid into the proving loop 26. The fluid entering the proving loop 26 pushes a ball, also known as a "pig," through the proving loop. Initially, the pig passes and activates a first switch, S1. Upon activation of the first switch, S1, the controller 20 senses the pulses generated by the flow meter 10 until the meter-proving process is terminated when the pig passes a second switch, S2. The time it takes the pig to travel from the first switch, S1, to the second switch, S2, is the duration of the meter-proving period.

During the meter-proving process, the module 22 senses the density of the fluid flowing in the proving loop 26. The sensed density values are linearized by the controller 20. The controller 20 utilizes the linearized density value and the amount of pulses sensed during the meter-proving process to calculate a correction factor, M, to later be used by the controller, for determining the volume of fluid flowing through the transportation fluid system. The correction factor is utilized in equation AGA-7 to update the accuracy of the flow meter 10 in the system. The accuracy of the flow meter 10 can be improved by adjusting the flow meter or the factors (M or K), used to determine the flow volume of the flow meter.

Figure 5:
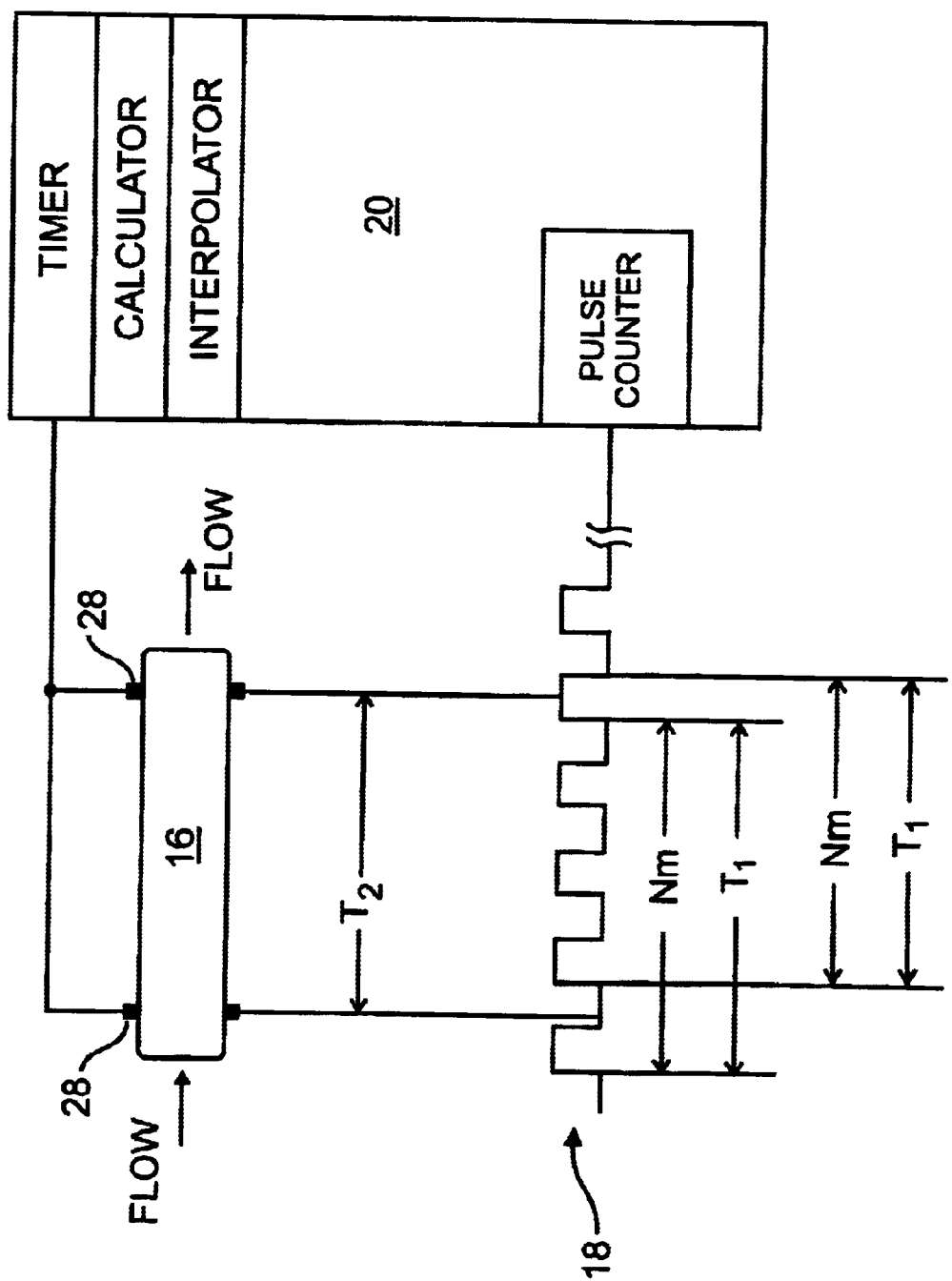
FIG. 5 is a timing diagram of the preferred interpolation method of the present invention.

Generally, the turbine pulse signal is not in synch with the flow meter 10 proving process, i.e., the meter-proving process will generally not start at the beginning of the turbine pulse signal. See FIG. 5. Thus, partial pulses occur at the beginning and end of the proving period. An interpolator 32 utilizes a pulse interpolation method to improve the discrimination of the flow meter's output, thus requiring a lesser amount of pulse signals to be collected during the meter-proving process. Because fewer pulse signals are required, the proving loop 26 can be shortened, thus reducing the cost of the fluid transportation system.

While various interpolation methods can be used, the preferable interpolation method utilized by the controller 20 is double chronometry, also found in the API 2540 standards. Double chronometry pulse interpolation requires counting a total integral number of flow meter pulses, Nm, generated during the proving process and measuring a set of time intervals, T1 and T2. T1 is the time interval between the first pulse before or after the first detection signal and the first pulse before or after the last detection signal. T2 is the time interval between the first and last detector pulses. See FIG. 5.

The pulse monitor 34 is started and stopped by a meter prover detector 28. The time intervals T1 and T2 correspond to Nm pulses and the interpolated number of pulses, N1, respectively. The interpolated pulse count, N1, is equal to Nm(T2/T1). An accumulator 36 sums and stores the total number of pulse signals for use by the controller 10 in determining flow volume. The total number of pulses is the sum of the integral pulses and the interpolated partial pulses. At the beginning of another meter-proving process, the controller 20 resets the accumulator 36, calculator 30, and the pulse counter 21.

While the specific embodiment has been illustrated and described, numerous modifications come to mind without significantly departing from the spirit of the invention, and the scope of protection is only limited by the scope of the accompanying claims.

I claim:

1. For a fluid transportation system having a controller for monitoring fluid flow and controlling transportation of the fluid, a method of proving a flow meter, the flow meter being operably connected to a controller and a proving loop having a known flow volume, wherein the controller monitors the fluid flow within the proving loop and executes a proving process, the method comprising the steps of:

starting a meter-proving period;

sensing a pulse signal responsive to a flow meter being operably connected in the path of the fluid, the flow meter generating the fluid flow, wherein the sensed pulse signal may include fractional pulse signals;

ending the meter-proving period;

calculating the amount of sensed pulse signals occurring during the meter-proving period, wherein the amount of sensed pulse signals may include fractional pulse signals;

sensing a density of the fluid;

utilizing the sensed density and the calculated amount of sensed pulse signal to calculate a flow volume of the proving loop; and, comparing the known flow volume of the proving loop to the calculated flow volume of the proving loop, wherein any difference between the known flow volume and the calculated flow volume can be utilized to improve the accuracy of the flow.

2. The method of proving a flow meter of claim 1 wherein the known flow volume of the proving loop is substantially equivalent to 10,000 pulse signals.

3. The method of proving a flow meter of claim 1 further including:

adjusting the flow meter in response to the comparison of the known flow volume of the proving loop to the calculated flow volume of the proving loop.

4. The method of proving a flow meter of claim 1 further including:

adjusting a module operably connected to the controller in response to the comparison of the known flow volume of the proving loop to the calculated flow volume of the proving loop, wherein the module more accurately calculates the fluid flow.

5. The method of claim 1 wherein calculating the amount of sensed pulse signals occurring during the meter proving period comprises interpolating a partial pulse signal of the sensed flow meter signal occurring after sensing has begun and before a first full pulse signal, and interpolating a partial pulse signal of the sensed flow meter signal occurring after the last full pulse signal of the flow meter signal and before sensing has stopped.

6. The method of claim 5 wherein the calculation of the sensed flow meter pulse signal utilizes a double chronometry method of interpolation.

7. The method of claim 1 wherein the flow meter is a turbine.

8. For a fluid transportation system having a controller for monitoring fluid flow and controlling transportation of the fluid, a method of measuring a flow volume of the fluid within a conduit, wherein a controller having a module and being operably connected to a flow meter and the conduit determines the flow volume of the fluid within the conduit, the method comprising the steps of:

sensing a number of pulse signals, wherein at least one of the pulse signals comprises a partial pulse signal and wherein at least one of the pulse signals comprises an integral pulse signal;

interpolating the partial pulse signals;

calculating the total number of pulses by adding the integral pulse signals and the interpolated partial pulse signals;

sensing a density of the fluid;

storing the sensed density value as a dynamic variable in the controller; and, calculating a correction factor, M, by utilizing the sensed dynamic density of the fluid.

9. The method of claim 8 wherein the flow meter is a turbine.

10. A controller for monitoring and controlling a fluid transportation system, the system comprising a flow meter operably connected to a conduit, the controller monitors a fluid within the system and calculates a flow volume of the fluid flowing through the conduit, the controller comprising:

a module being operably connected to the controller, the module for sensing a pulse signal generated by the flow meter, wherein the pulse signal comprises integral pulse signals and at least one partial pulse signal;

an input channel being operably connected to the module and adaptable to a range of input voltages;

a densitometer being operably connected to the input channel, the densitometer senses the real time density of the fluid and stores the sensed value as a dynamic variable in the controller; and, a calculator for determining a correction factor for the volumetric flow of the fluid by utilizing the sensed dynamic density value and the sensed pulse signals.

11. The controller of claim 10 comprising a display for displaying a system error, the error is identified with the input channel.

12. The controller of claim 10 wherein the range of input voltages is 25 mV–30V DC.

13. The controller of claim 10 wherein the flow meter is a turbine.

14. A controller for meter proving a fluid transportation system, the fluid transportation system comprising a conduit being operably connected to a flow meter, and a proving loop attached to the conduit, the proving loop having a known flow volume measured in pulse signals generated by the flow meter during a meter-proving period, the controller comprising:

a module being operably connected to the controller;

a plurality of input channels being operably connected to the module;

a pulse monitor having a 5 MHz resolution clock, the pulse monitor being operably connected to the flow meter wherein a pulse signal generated by the flow meter during the meter-proving period is capable of being sensed by the pulse monitor;

an interpolator being operably connected to the pulse monitor wherein the interpolator is capable of determining a fractional pulse signal amount of the sensed partial pulse signal;

an accumulator being operably connected to the interpolator and capable of summing all the pulse signals sensed during the meter proving period, the sensed pulse signals include the full and interpolated partial pulse signals, a calculator utilizing the accumulated pulse signals during the meter-proving process to calculate the flow volume of the proving loop, the calculated flow volume being measured in pulse signals; and, a comparator for comparing the known number of pulses of the proving loop and the accumulated pulse signals sensed during the meter proving period, wherein any difference between the known flow volume and the calculated flow volume can be utilized to improve the accuracy of the flow meter.

15. The controller of claim 14 wherein the meter proving period for sensing the pulse signal generated by the flow meter is approximately 10,000 pulse signals.

16. The controller of claim 14 wherein the interpolator utilizes a double chronometry pulse interpolation.

17. The controller of claim 14 wherein the plurality of input channels are each adaptable for receiving an input signal having a voltage range of 25 mV–30V DC.

18. The controller of claim 14 wherein the flow meter is a turbine.

* * * * *